Patented Oct. 22, 1935

2,018,394

UNITED STATES PATENT OFFICE 2,018,394

PROCESS FOR THE MANUFACTURE OF BAKING PREPARATIONS FROM MILK

Alexander Axelrod, Zurich, Switzerland

No Drawing. Application May 12, 1934, Serial No. 725,341. In Germany February 27, 1934

29 Claims. (Cl. 99—10)

The object of this invention is a process for the manufacture of a milk product, which is particularly suitable as an addition for baking purposes.

The process according to this invention consists substantially in converting the milk proteins into a finely divided, soluble form and extensively freeing the resulting product from water, the said product being, for example, concentrated by evaporation or dried.

It has already been proposed in the manufacture of milk products for baking purposes, for example dry milk powder, to treat milk with bacteria, for example kefir cultures and the like, which give rise to the separation of the albumin and, after separation of the resulting precipitate, to reduce the latter to dry form.

It has also already been proposed to treat milk with peptonizing bacteria, which are incapable of producing lactic acid or are only capable of producing small quantities thereof, and, after the proteins have separated out in the form of a fine flocculent precipitate, to reduce the resulting mass to dry form, preferably with the addition of peptizing agents, such as secondary sodium phosphate, in order to obtain as uniform and as extensively decomposed a product as possible, which is distinguished by a high nutritive value and accordingly considerably increases the digestibility of baked articles prepared therewith.

According to the present invention it has been found that the process of converting the milk proteins into a soluble form, which process is in itself valuable for the aforesaid properties of the milk product, can be extended considerably further and that products can be obtained thereby, in which the albumin and casein are extensively peptonized, without the danger of a putrefaction fermentation setting in, as would in itself have been expected.

The aforesaid result is obtained in accordance with this invention, by allowing an acid fermentation to take place but at the same time depriving the milk sugar of its power of increasing the virulence of the lactic acid bacteria to such an extent that they are capable of detrimentally influencing the development of the non-acidifying peptone bacteria, likewise present in the nutrient medium.

According to this invention it has been found that an extremely fine flocculent precipitate, having a substantially higher peptone content may be obtained, even without the co-operation of peptizing chemical admixtures, such as secondary sodium phosphate, which were hitherto regarded as being practically indispensable, if the peptone bacteria, which are incapable of producing lactic acid, employed in addition to the lactic acid-producing peptonizing bacteria, such as bacillus caucasicus and the like, are first afforded the opportunity of increasing their virulence to such an extent, without being in any way detrimentally influenced by acid fermentation, that they are not hindered in their development by the occurrence and continuance of the acid fermentation, and steps are taken in the further course of the fermenting process to prevent the lactic acid fermentation from assuming such proportions as would have a retarding effect on the peptonization. For this purpose it is necessary either to remove a certain proportion of the milk sugar content at the commencement of the process or, alternatively, to ensure the presence of bacteria, which effect decomposition of the same, and in this way to render an undesirable increase of the virulence of the acid bacteria impossible.

The aforesaid procedure renders it unnecessary to check the lactic acid formation of the bacteria employed, for example bacillus acidophilus or bacillus caucasicus, at the outset by correspondingly controlling the growth of the cultures, since, provided they are introduced into a nutrient medium which is practically free from lactic acid producers and in which peptone bacteria have already so far developed that the lactic acid producers are no longer capable of overgrowing them, the virulence of the said lactic acid producers becomes so limited, that the above-mertioned procedure of restricting the milk sugar content is sufficient to ensure a constant excess weight of the peptone bacteria.

The most suitable peptone bacteria are those which have a strong peptonizing action, such as micrococcus casei liquefaciens, streptococcus liquefaciens or the like. One method of reducing the milk sugar content is first to bring about separation of the whey from the albuminous substances by acidifying or by the addition of rennet or the like and then to remove the whey, together with the predominant amount of milk sugar taken up therein. The milk sugar left behind with the albuminous substances, after the precipitate has been expressed until about 15-18% of dry substance remains, is relatively so small in amount that it renders any undesirable development of the lactic acid producers impossible from the outset and also, in general, renders it unnecessary to effect an alcoholic fermentation, with a view to removing the milk sugar. An alternative method, which avoids any loss of the nutrient salts and the like by being taken up by the whey and removed therewith, is to decompose the milk sugar with the aid of yeast cultures, such as lacto-yeast, into carbonic acid and alcohol and in this way to deprive the lactic acid producers of their nutrient media to such an extent, that the final acidity does not substantially exceed 100° Soxhlet-Henkel and that the peptonization of albumin and casein, i. e. the conversion of the higher albuminous substances into lower albuminous substances, cannot be detrimentally influenced during the fermentation process.

In carrying the process of this invention into effect the formation of detrimental subsidiary cultures, i. e. a putrefaction fermentation, could in no case be ascertained, although, according to existing ideas, when employing strongly peptonizing bacteria, such as micrococcus casei liquefaciens and the like, the danger of the development of products detrimental to health by subsidiary fermentations, was in itself considered to be very great.

Since, in carrying the fermentation process according to this invention into effect, the capability of producing lactic acid is in itself without importance, pronounced lactic acid producers, such as bacillus acidi lactici, may also be employed, in addition to the aforesaid cultures. It is sufficient in this case merely to prevent undesirable development of the lactic acid bacteria by correspondingly diminishing their nutrient medium, i. e. the milk sugar content, and correspondingly controlling their degree of development as can be readily ascertained by prior tests.

A preferred method of carrying the process of this invention into effect is first to subject the milk to a pasteurizing treatment, in order to ensure an undetrimental development of the peptone bacteria culture or cultures employed. The pasteurized milk is then treated at temperatures, which ensure a favourable development of the peptone bacteria employed, i. e. about 25–30° C., with the peptone bacteria and is then allowed to stand until the cultures introduced show a uniform and satisfactory development, which is in general found to be the case after about 12–24 hours. If no separation of the whey to about 85% residual moisture content in the expressed precipitate has been effected, with a view to diminishing the milk sugar content, i. e. if milk or skim milk as such has been subjected to the treatment, it is advisable to introduce the yeast culture, employed for the alcoholic fermentation of the milk sugar, at the latest shortly before introducing the lactic acid producer.

When the mass has reached a condition, which still lies below the limit to be set for a putrefaction fermentation and which would probably correspond to a peptone content between about 2% and 3%, the culture, employed for the lactic acid fermentation, is introduced and the entire mass then allowed to stand until the peptone content has reached at least about 5%. The quantity of yeast cultures to be added, in order to decompose the milk sugar by alcoholic fermentation, depends in general on the strength of the lactic acid producer, and an upper limit of acidity of the end product, which, as mentioned above, should not substantially exceed 80–100° Soxhlet-Henkel, whilst the adjustment of the proportions of the milk sugar-decomposing bacteria cultures depends in individual cases on various factors, as, for example, on the process of development of peptonization and the like. In individual cases it is advisable so to adjust the proportion of the bacteria causing lactic acid fermentation to the bacteria causing alcoholic fermentation, that they are capable of decomposing equal parts, but the entire decomposition of the milk sugar originally present must not amount to more than about 70%.

The product obtained after reaching a minimum peptone content of about 5% is relatively thinly liquid and can be easily reduced to dry form by methods known per se, for example with the aid of atomizing drying apparatus, cylindrical vacuum driers or the like, known in the manufacture of dry milk, but may if desired be also employed in the form in which it is obtained.

*Examples*

1. 100 litres of skim milk are pasteurized at 90° C. and then cooled down to about 25° C. 3 litres of a pure culture of micrococcus casei liquefaciens and ½ litre of lacto-yeast are then added and the mass is maintained for about 12–24 hours between 25 and 30° C., after which ½ litre of a culture of bacillus caucasicus is added and the entire mass heated to about 35–37° C. After a period of about 3 to 24 hours, the mass shows a peptone content of about 7.4%, calculated on the dry content and a degree of acidity of about 80–100° Soxhlet-Henkel. The mixture is then cooled down to about 10° C. and finally freed from its water content by known methods.

2. 100 litres of skim milk, pasteurized and cooled as described in Example 1, are treated with 2 litres of a culture of micrococcus casei liquefaciens, ½ litre of streptococcus liquefaciens and ½ litre of lacto-yeast. After a period of about 20 hours, during which the mass is maintained at about 30° C., a satisfactory yield of peptone bacteria is obtained. ½ litre of bacillus acidi lactici is then added and the entire mass allowed to stand for about 3 days. The mass then shows an acid content of about 100° Soxhlet-Henkel and a peptone content of about 7.4% and is subjected to drying as hereinbefore described. Investigation shows extensive conversion of the protein into lower albuminous substances. The product is whitish in colour.

3. 100 litres of skim milk are first treated with rennet until a uniform and complete precipitation of the albuminous substances has taken place. The precipitate is then separated from the whey and expressed until the liquid content amounts to about 80–85%. 5 litres of a pure culture of micrococcus casei liquefaciens are then added to the resulting product and the mass is maintained for about 20 hours at 25–30° C., after which about ½ litre of bacillus acidophilus is added, the entire mass heated to about 35° C. and allowed to stand for about 3 to 24 hours. The product, which consists of a relatively thin pasty product which can be readily dried on a cylindrical drier, contains about 7.6% of peptone and has a degree of acidity of about 100° Soxhlet-Henkel.

The employment, preferably in dry form, of milk products prepared according to this invention has shown that the extensive peptonization, obtained by the simultaneous action of strong peptone bacteria in a nutrient medium containing a limited amount of milk sugar, does not give rise to the disadvantageous phenomena observed when employing milk as such, such as diminution in volume, reduction of the water-absorbing powers and the like, but that baked articles prepared therewith, apart from their substantial increased digestibility, are particularly distinguished by an extensive promotion of the fermentation of the dough and considerable loosening of the crumb, so that the milk products of this invention are especially adapted to be worked up with flours which in themselves tend to flatten out doughs mixed therewith.

The milk products prepared according to this invention and which contain all the constituents of the milk in soluble form, may be utilized by replacing a part, for example 10% and more, of the flour required for preparing a baked article, by the milk powder and carrying out the baking process in the usual manner with the resulting mixture. The products prepared according to this invention may, however, also be employed for other purposes, for example as an addition in the manufacture of chocolates, food preparations, fruit masses or the like, which are rendered considerably more digestible and wholesome thereby.

When employing the products of this invention for baking purposes, it has been found to be particularly advantageous to maintain the paste or dough somewhat softer. In particular it is possible to increase the water content, whereby the yield of finished product is also increased. It has been found that the paste or dough, owing to the higher water absorption due to the addition of the milk products of this invention, slowly stiffens during the process of fermentation, and that, moreover, less yeast need be added to effect the fermentation. As a result of the foregoing very loose and easily worked up products are obtained, which have proved to be particularly advantageous when mechanical apparatus are employed for preparing and working up the said products.

What I claim is:

1. A process for the manufacture of a baking preparation from milk, which comprises subjecting milk to peptonization with the aid of bacteria and to lactic acid fermentation, the said lactic acid fermentation being prevented from detrimentally influencing the peptone formation by limiting the milk sugar content of the milk, and subsequently adding lactic acid producers.

2. A process for the manufacture of a baking preparation from milk, which comprises subjecting whole milk to peptonization with the aid of bacteria and to lactic acid fermentation, the said lactic acid fermentation being prevented from detrimentally influencing the peptone formation by limiting the milk sugar content of the whole milk, and subsequently adding lactic acid producers.

3. A process for the manufacture of a baking preparation from milk, which comprises subjecting skim milk to peptonization with the aid of bacteria and to lactic acid fermentation, the said lactic acid fermentation being prevented from detrimentally influencing the peptone formation by limiting the milk sugar content of the skim milk, and subsequently adding lactic acid producers.

4. A process for the manufacture of a baking preparation from milk, which comprises subjecting sterilized milk to peptonization with the aid of bacteria and to lactic acid fermentation, the said lactic acid fermentation being prevented from detrimentally influencing the peptone formation by limiting the milk sugar content of the sterilized milk, and subsequently adding lactic acid producers.

5. A process for the manufacture of a baking preparation from milk, which comprises subjecting milk sterilized by pasteurization to peptonization with the aid of bacteria and to lactic acid fermentation, the said lactic acid fermentation being prevented from detrimentally influencing the peptone formation by limiting the milk sugar content of the milk, and subsequently adding lactic acid producers.

6. A process for the manufacture of a baking preparation from milk, which comprises subjecting whole milk sterilized by pasteurization to peptonization with the aid of bacteria and to lactic acid fermentation, the said lactic acid fermentation being prevented from detrimentally influencing the peptone formation by limiting the milk sugar content of the whole milk, and subsequently adding lactic acid producers.

7. A process for the manufacture of a baking preparation from milk, which comprises subjecting skim milk sterilized by pasteurization to peptonization with the aid of bacteria and to lactic acid fermentation, the said lactic acid fermentation being prevented from detrimentally influencing the peptone formation by limiting the milk sugar content of the skim milk, and subsequently adding lactic acid producers.

8. A process for the manufacture of a baking preparation from milk, which comprises subjecting milk to peptonization with the aid of micrococcus casei liquefaciens and to lactic acid fermentation, the said lactic acid fermentation being prevented from detrimentally influencing the peptone formation by limiting the milk sugar content of the milk, and subsequently adding lactic acid producers.

9. A process for the manufacture of a baking preparation from milk, which comprises subjecting skim milk to peptonization with the aid of micrococcus casei liquefaciens and to lactic acid fermentation, the said lactic acid fermentation being prevented from detrimentally influencing the peptone formation by limiting the milk sugar content of the skim milk, and subsequently adding lactic acid producers.

10. A process for the manufacture of a baking preparation from milk, which comprises subjecting milk to peptonization with the aid of streptococcus liquefaciens and to lactic acid fermentation, the said lactic acid fermentation being prevented from detrimentally influencing the peptone formation by limiting the milk sugar content of the milk, and subsequently adding lactic acid producers.

11. A process for the manufacture of a baking preparation from milk, which comprises subjecting skim milk to peptonization with the aid of streptococcus liquefaciens and to lactic acid fermentation, the said lactic acid fermentation being prevented from detrimentally influencing the peptone formation by limiting the milk sugar content of the skim milk, and subsequently adding lactic acid producers.

12. A process for the manufacture of a baking preparation from milk, which comprises subjecting milk to peptonization with the aid of micrococcus casei liquefaciens and streptococcus liquefaciens and to lactic acid fermentation, the said lactic acid fermentation being prevented from detrimentally influencing the peptone formation by limiting the milk sugar content of the milk, and subsequently adding lactic acid producers.

13. A process for the manufacture of a baking preparation from milk, which comprises subjecting skim milk to peptonization with the aid of micrococcus casei liquefaciens and streptococcus liquefaciens and to lactic acid fermentation, the said lactic acid fermentation being prevented from detrimentally influencing the peptone formation by limiting the milk sugar content of the skim milk, and subsequently adding lactic acid producers.

14. A process for the manufacture of a baking preparation from milk, which comprises subjecting skim milk to peptonization with the aid of micrococcus casei liquefaciens and to lactic acid fermentation with the aid of bacillus caucasicus, the said lactic acid fermentation being prevented from detrimentally influencing the peptone formation by limiting the milk sugar content of the skim milk, and subsequently adding lactic acid producers.

15. A process for the manufacture of a baking preparation from milk, which comprises subjecting skim milk to peptonization with the aid of streptococcus liquefaciens and to lactic acid fermentation with the aid of bacillus caucasicus, the said lactic acid fermentation being prevented from detrimentally influencing the peptone formation by limiting the milk sugar content of the skim milk, and subsequently adding lactic acid producers.

16. A process for the manufacture of a baking preparation from milk, which comprises subjecting milk to peptonization with the aid of bacteria and to lactic acid fermentation with the aid of facillus acidophilus, the said lactic acid fermentation being prevented from detrimentally influencing the peptone formation by limiting the milk sugar content of the milk, and subsequently adding lactic acid producers.

17. A process for the manufacture of a baking preparation from milk, which comprises subjecting milk to peptonization with the aid of bacteria and to lactic acid fermentation, the said lactic acid fermentation being prevented from detrimentally influencing the peptone formation by limiting the milk sugar content of the milk, and subsequently adding lactic acid producers, the total quantity of milk sugar removed by the process amounting to at most 70%.

18. A process for the manufacture of a baking preparation from milk, which comprises subjecting milk to peptonization with the aid of bacteria and to lactic acid fermentation, detrimental influence of the peptone formation being prevented by limiting the milk sugar content of the milk by subjecting the said milk sugar to alcoholic fermentation, and subsequently adding lactic acid producers.

19. A process for the manufacture of a baking preparation from milk, which comprises subjecting milk to peptonization with the aid of bacteria and to lactic acid fermentation, detrimental influence of the peptone formation being prevented by limiting the milk sugar content of the milk by subjecting the said milk sugar to alcoholic fermentation by the addition of lacto-yeast, and subsequently adding lactic acid producers.

20. A process for the manufacture of a baking preparation from milk, which comprises subjecting milk to peptonization with the aid of bacteria and to lactic acid fermentation, the said lactic acid fermentation being prevented from detrimentally influencing the peptone formation by limiting the milk sugar content of the milk, and subsequently adding lactic acid producers, the final acidity of the product not exceeding a value of 100° Soxhlet-Henkel.

21. A process for the manufacture of a baking preparation from milk, which comprises subjecting milk to peptonization with the aid of bacteria and to lactic acid fermentation, the said lactic acid fermentation being prevented from detrimentally influencing the peptone formation by removing up to 70% of the total quantity of milk sugar originally present, and subsequently adding lactic acid producers, the final acidity of the product not exceeding a value of 100° Soxhlet-Henkel.

22. A process for the manufacture of a baking preparation from milk, which comprises subjecting milk to peptonization with the aid of bacteria and to lactic acid fermentation, the sterilized milk being freed by alcoholic fermentation with the aid of lacto-yeast and lactic acid fermentation from at most 70% of its milk sugar content in such a way that the peptonization with the aid of peptone bacteria is not detrimentally influenced and the final acidity of the product amounts to about 100° Soxhlet-Henkel.

23. A process for the manufacture of a baking preparation from milk, which comprises subjecting milk to peptonization with the aid of bacteria and to lactic acid fermentation, the sterilized skim milk being freed by alcoholic fermentation with the aid of lacto-yeast and lactic acid fermentation with the aid of lactic acid bacteria from at most 70% of its milk sugar content in such a way that the peptonization with the aid of peptone bacteria is not detrimentally influenced and the final acidity of the product amounts to about 100° Soxhlet-Henkel.

24. A process for the manufacture of a baking preparation from milk, which comprises subjecting milk to peptonization with the aid of bacteria and to lactic acid fermentation, the said lactic acid fermentation being prevented from detrimentally influencing the peptone formation by limiting the milk sugar content of the milk, subsequently adding lactic acid producers, and reducing the resulting product to dry form.

25. A process for the manufacture of a baking preparation which comprises separating milk into whey and casein, removing a part of said whey and the milk sugar contained therein in sufficient quantity to eliminate up to 70% of the milk sugar originally contained in said milk, and subsequently subjecting the said residual product to peptonization and to lactic acid fermentation whereby the detrimental effects of lactic acid fermentation on the peptonization are prevented.

26. A process for the manufacture of a baking preparation which comprises adding rennet to milk to separate the same into whey and casein, removing a part of said whey and the milk sugar contained therein in sufficient quantity to eliminate up to 70% of the milk sugar originally contained in said milk, and subsequently subjecting the residual product to peptonization and to lactic acid fermentation whereby the detrimental effects of lactic acid fermentation on the peptonization are prevented.

27. A process for the manufacture of a baking preparation which comprises adding acid to milk to separate same into whey and casein, removing a part of said whey and the milk sugar contained therein in sufficient quantity to eliminate up to 70% of the milk sugar originally contained in said milk, and subsequently subjecting the residual product remaining after removal of said whey to peptonization and to lactic acid fermentation whereby detrimental effects of lactic acid fermentation on the peptonization are prevented.

28. A process for the manufacture of a baking preparation from milk which comprises subjecting skim milk to peptonization with the aid of micrococcus casei liquefaciens and subsequently to lactic acid fermentation with the aid of lactic acid bacteria, and limiting the milk sugar content of said milk by alcoholic fermentation with the aid of yeast to prevent detrimentally influencing the peptonization, the peptone content of the resulting product being increased to more than 7% calculated on the dry content and the degree of acidity of said product being increased to about 100° Soxhlet-Henkel.

29. A process for the manufacture of a baking preparation from milk which comprises subjecting skim milk to peptonization with the aid of micrococcus casei liquefaciens and subsequently to lactic acid fermentation with the aid of lactic aid bacteria, and limiting the milk sugar content of said milk by alcoholic fermentation with the aid of yeast to prevent detrimentally influencing the peptonization, the peptone content of the resulting product being increased to more than 7% calculated on the dry content and the degree of acidity of said product being increased to about 100° Soxhlet-Henkel, and reducing the resulting product to dry form.

ALEXANDER AXELROD.